(12) United States Patent
Lovmand et al.

(10) Patent No.: US 8,694,169 B2
(45) Date of Patent: Apr. 8, 2014

(54) SYSTEM AND METHOD OF CONTROLLING A WIND TURBINE IN A WIND POWER PLANT

(75) Inventors: Bo Lovmand, Hadsten (DK); Keld Rasmussen, Herning (DK); John Bengtson, Højbjerg (DK)

(73) Assignee: Vestas Wind Systems A/S, Aarhus N (DK)

( * ) Notice: Subject to any disclaimer, the term of this patent is extended or adjusted under 35 U.S.C. 154(b) by 319 days.

(21) Appl. No.: 12/395,349

(22) Filed: Feb. 27, 2009

(65) Prior Publication Data

US 2009/0204266 A1 Aug. 13, 2009

Related U.S. Application Data

(63) Continuation of application No. PCT/DK2007/000392, filed on Sep. 3, 2007.

(30) Foreign Application Priority Data

| | | | |
|---|---|---|---|
| Sep. 1, 2006 | (DK) | ................................. | 2006 01133 |
| Dec. 12, 2006 | (DK) | ................................. | 2006 01631 |

(51) Int. Cl.
  *G06F 1/28* (2006.01)
(52) U.S. Cl.
  USPC ................................ 700/287; 290/44; 290/55
(58) Field of Classification Search
  USPC ................................ 700/286, 287; 290/44, 55
  See application file for complete search history.

(56) References Cited

U.S. PATENT DOCUMENTS

| | | | |
|---|---|---|---|
| 4,536,877 A | 8/1985 | Livingston et al. |
| 4,568,930 A | 2/1986 | Livingston et al. |
| 4,623,886 A | 11/1986 | Livingston |
| 4,719,458 A | 1/1988 | Miesterfeld et al. |
| 4,739,402 A | 4/1988 | Maeda et al. |
| 4,897,833 A | 1/1990 | Kent et al. |
| 4,970,716 A | 11/1990 | Goto et al. |
| 5,077,733 A | 12/1991 | Whipple |

(Continued)

FOREIGN PATENT DOCUMENTS

| | | |
|---|---|---|
| DE | 10 2004 060 943 A1 | 7/2006 |
| EP | 1 519 040 A1 | 3/2005 |

(Continued)

OTHER PUBLICATIONS

International Search Report, Sep. 27, 2007, 2 pages.

(Continued)

*Primary Examiner* — Charles Kasenge
(74) *Attorney, Agent, or Firm* — Patterson & Sheridan, LLP (57) ABSTRACT

The invention relates to a central controller adapted for controlling a number of wind turbines. The wind turbines being controlled and monitored by the central controller via a first monitoring and control network and a second monitoring and control network. The term monitoring and control network is in accordance with an embodiment of the invention understood as a data communication network which communicates at least control data for control of wind turbines, but may also communicate monitoring data, i.e. measure data. A typical example of a control of wind turbines is that the central controller sets the power set-point (the power to be produced) of each wind turbine in the wind power plant. The important control signals may be separated from high-bandwidth requiring monitoring data, such as analysis data in the communication network.

25 Claims, 7 Drawing Sheets

(56) References Cited

U.S. PATENT DOCUMENTS

| | | | |
|---|---|---|---|
| 5,319,641 A | 6/1994 | Fridrich et al. | |
| 5,353,287 A | 10/1994 | Kuddes et al. | |
| 5,826,017 A | 10/1998 | Holzmann | |
| 5,852,723 A | 12/1998 | Kalkunte et al. | |
| 6,111,888 A | 8/2000 | Green et al. | |
| 6,253,260 B1 | 6/2001 | Beardsley et al. | |
| 6,272,147 B1 | 8/2001 | Spratt et al. | |
| 6,853,094 B2 * | 2/2005 | Feddersen et al. | 290/44 |
| 6,888,262 B2 * | 5/2005 | Blakemore | 290/44 |
| 6,925,385 B2 | 8/2005 | Ghosh et al. | |
| 6,966,754 B2 | 11/2005 | Wobben | |
| 7,013,203 B2 * | 3/2006 | Moore et al. | 700/286 |
| 7,019,413 B2 * | 3/2006 | Kinoshita | 290/4 R |
| 7,239,035 B2 * | 7/2007 | Garces et al. | 290/54 |
| 7,298,059 B2 * | 11/2007 | Delmerico et al. | 307/85 |
| 7,298,698 B1 | 11/2007 | Callum | |
| 7,318,154 B2 * | 1/2008 | Tehee, Jr. | 713/155 |
| 7,346,462 B2 * | 3/2008 | Delmerico | 702/60 |
| 7,603,202 B2 * | 10/2009 | Weitkamp | 700/287 |
| 7,606,638 B2 * | 10/2009 | Fortmann et al. | 700/287 |
| 7,677,869 B2 * | 3/2010 | Martinez De Lizarduy Romo et al. | 416/37 |
| 7,679,215 B2 * | 3/2010 | Delmerico et al. | 290/55 |
| 7,693,061 B2 | 4/2010 | El-Sakkout et al. | |
| 7,706,398 B2 | 4/2010 | Jung et al. | |
| 7,840,312 B2 * | 11/2010 | Altemark et al. | 700/286 |
| 8,032,614 B2 * | 10/2011 | Riesberg et al. | 700/287 |
| 2002/0029097 A1 * | 3/2002 | Pionzio et al. | 700/286 |
| 2002/0090001 A1 | 7/2002 | Beckwith | |
| 2003/0014219 A1 | 1/2003 | Shimizu et al. | |
| 2004/0015609 A1 | 1/2004 | Brown et al. | |
| 2004/0230377 A1 | 11/2004 | Ghosh et al. | |
| 2005/0090937 A1 | 4/2005 | Moore et al. | |
| 2006/0132993 A1 * | 6/2006 | Delmerico et al. | 361/20 |
| 2006/0132994 A1 * | 6/2006 | Delmerico et al. | 361/20 |
| 2006/0171410 A1 | 8/2006 | Jung et al. | |
| 2006/0273595 A1 * | 12/2006 | Avagliano et al. | 290/44 |
| 2007/0140847 A1 * | 6/2007 | Martinez De Lizarduy Romo et al. | 416/11 |
| 2009/0160187 A1 | 6/2009 | Scholte-Wassink | |
| 2009/0204266 A1 | 8/2009 | Lovmand et al. | |
| 2009/0234510 A1 | 9/2009 | Helle et al. | |
| 2009/0254224 A1 | 10/2009 | Rasmussen | |
| 2009/0281675 A1 | 11/2009 | Rasmussen et al. | |
| 2010/0067526 A1 | 3/2010 | Lovmand | |
| 2010/0138182 A1 | 6/2010 | Jammu et al. | |
| 2010/0268849 A1 | 10/2010 | Bengtson et al. | |
| 2010/0274400 A1 | 10/2010 | Ormel et al. | |
| 2010/0274401 A1 | 10/2010 | Kjaer et al. | |
| 2010/0305767 A1 | 12/2010 | Bengtson | |
| 2010/0312410 A1 | 12/2010 | Nielsen | |
| 2011/0020122 A1 | 1/2011 | Parthasarathy et al. | |
| 2011/0035068 A1 | 2/2011 | Jensen | |

FOREIGN PATENT DOCUMENTS

| | | |
|---|---|---|
| EP | 1 531 376 A1 | 5/2005 |
| WO | 01/77525 A1 | 10/2001 |
| WO | 03/029648 A1 | 4/2003 |
| WO | 03/077048 A1 | 9/2003 |
| WO | 2005/042971 A1 | 5/2005 |
| WO | 2005047999 A1 | 5/2005 |
| WO | 2005055538 A1 | 6/2005 |

OTHER PUBLICATIONS

Report on Patentability, Jul. 28, 2008, 5 pages.
International Standard IEC 61400-25—Information and Information Exchange for Wind Power Plants; 1CD for 61400-25; IEC 2003; 4 pages.

* cited by examiner

SYSTEM AND METHOD OF CONTROLLING A WIND TURBINE IN A WIND POWER PLANT

CROSS-REFERENCE TO RELATED APPLICATIONS

The present application is a continuation of pending International patent application PCT/DK2007/00392 filed on Sep. 3, 2007 which designates the United States and claims priority from Danish Patent Application PA 2006 01133 filed Sep. 1, 2006 and Danish Patent Application PA 2006 01631 filed Dec. 12, 2006, the content of which is incorporated herein by reference.

FIELD OF THE INVENTION

The invention relates to a system and method of controlling a wind turbine in a wind power plant.

BACKGROUND OF THE INVENTION

The strategically distributed nature of wind power presents unique challenges. A wind park comprises several wind turbines and may be located onshore or offshore, and it often covers large geographic areas.

These factors usually require a variety of networked interconnections and telecommunication technologies for monitoring and controlling wind power electric generating facilities which often may be referred to as SCADA (SCADA: Supervisory Control And Data Acquisition).

One of several problems related to such control and monitoring network is, however, that the requirement to bandwidth, number of access point and access time has increased significantly over the last years.

A monitoring and control network is described in EP 0 1531 376 disclosing that a further network for transmission of large amounts of data may be added to an existing control and monitoring network in order to avoid that the high bandwidth requirements of the data interferes or blocks the control and monitoring network.

A problem related to the disclosed network is that addition of further high bandwidth requiring applications, such as data monitoring and data analysis either requires an even further network or—even worse—restricts the access time related to critical operations of the network. Even though introducing a further network, the monitoring and control data is still transmitted through the same network.

SUMMARY OF THE INVENTION

The invention relates to a central controller (CC) adapted for controlling a number of wind turbines (WT), said wind turbines (WT) are controlled and monitored by said central controller (CC) via a first monitoring and control network (MCN1) and a second monitoring and control network (MCN2).

The term monitoring and control network is in accordance with an embodiment of the invention understood as a data communication network which communicates at least control data for control of wind turbines, but may also communicate monitoring data, i.e. measure data. A typical example of a control of wind turbines is that the central controller sets the power set-point (the power to be produced) of each wind turbine in the wind power plant.

According to an advantageous embodiment of the invention, the control networks of the wind turbines are distributed between at least two data communication networks in order to establish a possibility of prioritization physically between different types of control data.

A further advantageous feature of the invention is also that the important control signals may be separated from high-bandwidth requiring monitoring data, such as analysis data in the communication network.

In an embodiment of the invention, critical power control data are communicated to (and from) said wind turbines (WT) via a separate control network of said at least two different data communication networks.

In an embodiment of the invention, the central controller (CC) controls and monitors said wind turbines via said first monitoring and control network (MCN1) and said second monitoring and control network (MCN2) by communication to and from wind turbine controllers (WTC) of said wind turbines (WT).

In an embodiment of the invention, the monitoring and control networks comprises at least one switch.

A buffer is understood as a temporary storage location for data information being sent or received. A switch is according to an embodiment of the invention understood as a device that filters and forwards data packets between segments. Switches operate at the data link layer of the OSI (Open Systems Interconnect) reference model and therefore support any packet protocol. A switch is an example of a communication bottleneck where the communication may be delayed. In an embodiment of the invention, one switch is applied for each wind turbine and in another embodiment, one switch is applied for several wind turbines. This may in a conventional setup with only one single monitoring and control network involve that data is queued in these switches and important and/or critical data may have long transmission times. In accordance with the present invention, it is possible to overcome this problem by means of applying a separate network which may be utilized for the most important and critical data to be transmitted between the central controller and the wind turbine controllers which entails a very optimized and quick control and regulation of a wind power plant facility. Many communication bottlenecks exist in a wind turbine data network which may delay data significantly when transmitted both from the central controller CC to the wind turbine controllers WTC1, WTC2, . . . , WTCn (typically control data) and from the wind turbine controllers WTC1, WTC2, . . . , WTCn to the central controller CC (typically monitoring data). These communication bottlenecks may be buffers, switches, routers, data-queues, etc.

A central controller is according to an embodiment of the invention understood as a device which centrally can control the wind power plant. This may be by means of controlling or regulating different elements in each wind turbine. The central controller may also have a processing unit and may typically comprise means for continuously monitoring the condition of the wind turbines and collect statistics on their operation and may at the same time send control instructions to the wind turbines. The central controller may also control a large number of switchgears, hydraulic pumps valves, and motors within the wind turbine, typically via communication with the wind turbine controller of the wind turbine.

In an embodiment of the invention, the wind turbines (WT) are comprised in a wind power plant (WPP).

The term "wind power plant" is according to the present invention understood as a facility with one or multiple wind turbines operating as a single power plant and interconnected to the utility grid at a single point. Wind power plants are also called wind farms, wind power stations, wind plants, wind parks, and wind energy projects. A wind power plant comprises a number of wind turbines located in the same area in a group onshore or offshore. The wind turbines may be assembled to constitute a total unified power producing unit that can be connected to the utility grid. A wind power plant typically has a "master" or central controller. The central controller may according to an embodiment of the invention be located as part of or in relation to a Supervisory Control And Data Acquisition (SCADA) server. The central controller may be related to a control station or substation which may comprise a number of computers or processing units. The central controller may also have a processing unit and may typically comprise means for or processing units continuously monitoring the condition of the wind turbines and collect statistics on their operation and may at the same time send control instructions to the wind turbines. The central controller may also control a large number of switchgears, hydraulic pumps valves, and motors within the wind turbine, typically via communication with the wind turbine controller of the wind turbine.

In an embodiment of the invention, the central controller (CC) forms part of a control loop (CL1, CL2, CL3).

In accordance with the invention, the term "control loop" is understood as a continuously repeated process, which for each execution/repetition/loop typically executes at least the following three steps:
  obtaining information data related to the wind power plant from the wind turbine in the central controller,
  performing a comparison of the information data with predefined data to determine an error, and
  performing a regulating action by means of transmitting a "write" instruction to the wind turbine according to the error.

In an embodiment of the invention, the central controller (CC) comprises a SCADA (Supervisory Control And Data Acquisition) server.

In an embodiment of the invention, the wind turbines (WT) each have at least two internal monitoring and control networks (MCN1, MCN2).

In an embodiment of the invention, the monitoring and control networks (MCN1 MCN2) are configured in a ring topology, a star topology or any combination thereof.

The network ring topology or star topology is in particular advantageous when the communication network is established by physical cables—compared to wireless networks—as the communication cables may be positioned together with the power cables thereby avoiding unnecessary excavation, mounting, suspension etc.

In an embodiment of the invention, the monitoring and control networks (MCN1, MCN2) may transmit data simultaneously.

Moreover, the invention relates to A wind power plant (WPP) wherein at least two wind turbines communicate via a monitoring and control network (MCN1) comprising a central controller (CC)
  in said system monitoring and control data are communicated between said at least two wind turbines (WT) and said central controller (CC),
  said data monitoring and control network communicates monitoring and control related data to and from said at least two wind turbines (WT),
  wherein at least a subset of the control related data of said monitoring and control related data are transmitted via a second monitoring and control network (MCN2).

The term monitoring and control network is in accordance with an embodiment of the invention understood as a data communication network which communicates at least control data for control of wind turbines, but may also communicate monitoring data, i.e. measure data.

The term control related data is in accordance with an embodiment of the invention understood as data that at least partly comprises information related to the controlling of one or several wind turbines. Examples of critical power control related data may be an instruction of setting the active or reactive power set point or an instruction of setting the power factor of a wind turbine.

The term monitoring related data is in accordance with an embodiment of the invention understood as data that at least partly comprises information related to the monitoring of one or several wind turbines. This may be measured data, e.g. the "turbine run state" which comprises information of the current run state of a wind turbine e.g. if the wind turbine is shut off. Another example of monitoring related data is information of the current active or reactive power set point of the wind turbine. The monitoring related data is typically transmitted from the wind turbines to the central controller.

The second monitoring and control communication network is understood as a network which at least communicates control related data, e.g. instructions to a wind turbine controller from the central controller of setting a specific power set-point.

In an embodiment of the invention, the second monitoring and control network also performs as a monitoring and control network (MCN2).

In an embodiment of the invention, the response time of a control loop of said second monitoring and control network is designed to be less than about one second, preferably less than 500 ms, most preferably below 200 ms.

Parts of the control data may advantageously within the scope of the invention be communicated via one monitoring and control network, allowing for the second monitoring and control network to only deal with high-priority critical data, such as a power set-point of a wind turbine which according to new criteria must be transmitted very fast. The second monitoring and control network is stable and fast transmitting according to the suitable quantity of data to be transmitted via the network.

In an embodiment of the invention, the data monitoring and control network is a copper, fiber or wireless network or a combination of these.

In an embodiment of the invention, the power control related data comprises a representation of one or more measurements relating to the wind turbine.

In an embodiment of the invention, the monitoring and control network is adapted for transmitting critical data.

In an embodiment of the invention, a power cable topology of power cables between the wind turbines (WT) are substantially the same as the data communication network cable topology between the wind turbines.

Moreover, the invention relates to a method of controlling a wind turbine (WT) in a wind power plant (WPP), whereby a central controller (CC) performs a monitoring and control procedure, said monitoring and control procedure comprises
  transmission of a number of control related data to be transmitted from said central controller (CC) to the wind turbine and
  transmission of monitoring related data from said wind turbine (WT) to the central controller (CC),
  whereby said transmission of control related data is performed via at least two different communication networks (MCN1, MCN2).

In an embodiment of the invention, said transmission of monitoring and control related data is performed via at least two different monitoring and control networks (MCN1, MCN2).

In an embodiment of the invention, the method comprises at least one performance of a control loop.

In accordance with the invention, the term "control loop" is understood as a continuously repeated process, which for each execution/repetition/loop typically executes at least the following three steps:
- obtaining information data related to the wind power plant in the central controller,
- performing a comparison of the information data with predefined data to determine an error, and
- performing a regulating action by means of transmitting a "write" instruction to the wind turbine according to the error.

The information to be obtained from the wind power plant in the above-mentioned "control-loop" may e.g. be measure data from the wind turbine or data collected from a grid measure meter or other elements comprised in the wind power plant.

Furthermore, the invention relates to a wind turbine (WT) comprising
- at least one wind turbine controller (WTC),
- a first monitoring and control network (MCN1) for transmitting monitoring and control related data between said wind turbine controller (WTC) and wind turbine elements, and
- a second monitoring and control network (MCN2) for transmitting control related data between said wind turbine controller (WTC) and wind turbine elements.

In an embodiment of the invention, said second monitoring and control network (MCN2) is adapted for transmitting monitoring and control related data.

In an embodiment of the invention, at least one of said wind turbine elements is a hub controller (HC).

In an embodiment of the invention, at least one of said wind turbine elements is a top controller (TC).

In an embodiment of the invention, at least one of said wind turbine elements is a sensor (S).

In an embodiment of the invention, critical power control related data are communicated via said first monitoring and control network (MCN1), and wherein less critical data such as measured data are communicated via said second monitoring and control network (MCN2).

BRIEF DESCRIPTION OF THE DRAWINGS

The invention will be described in the following with reference to the figures in which.

DETAILED DESCRIPTION OF THE INVENTION

Figure 1:
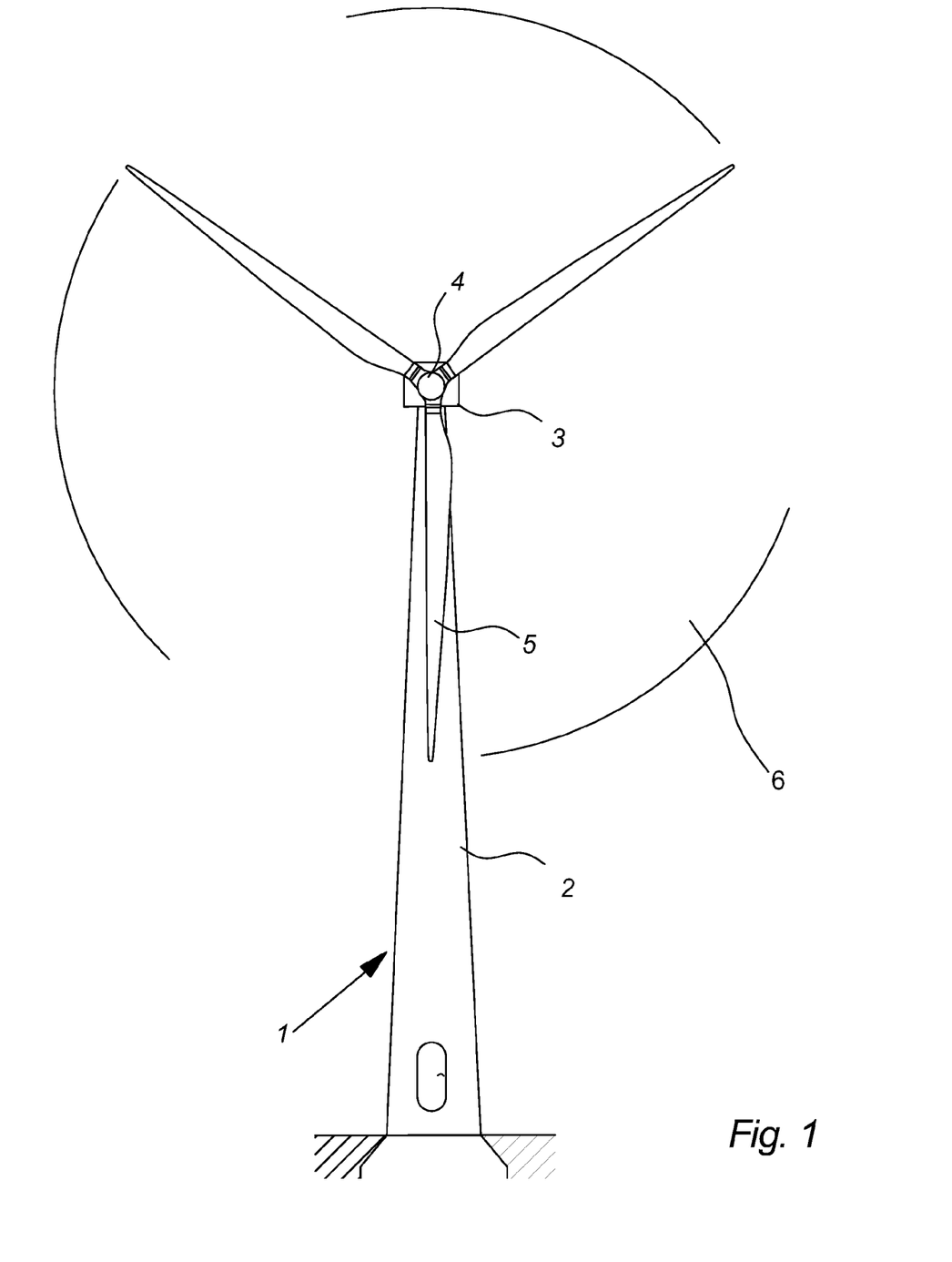
FIG. 1 illustrates a large modern wind turbine as seen from the front.

FIG. 1 illustrates a modern wind turbine 1. The wind turbine 1 comprises a tower 2 positioned on a foundation. A wind turbine nacelle 3 with a yaw mechanism is placed on top of the tower 2.

A low speed shaft extends out of the nacelle front and is connected with a wind turbine rotor through a wind turbine hub 4. The wind turbine rotor comprises at least one rotor blade e.g. three rotor blades 5 as illustrated.

Figure 2:
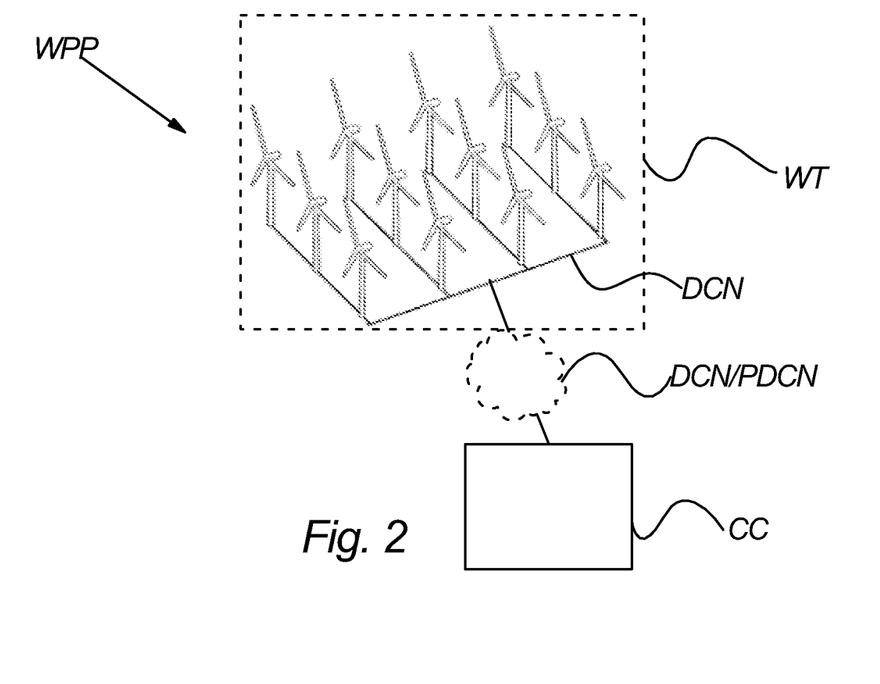
FIG. 2 illustrates an overview of a typical wind power plant.

FIG. 2 illustrates an overview of a typical wind power plant WPP according to an embodiment of the invention. A wind power plant may in some contexts be referred to as wind parks or wind farms. A wind power plant comprises a number of wind turbines WT located in the same area in a group onshore or offshore. The wind turbines may be assembled to constitute a total unified power producing unit that can be connected to the utility grid. A wind power plant typically has a "master" or central controller CC. The central controller CC may, according to an embodiment of the invention, be located as part of or in relation to a SCADA server. The central controller CC may be related to a control station or substation which may comprise a number of computers or processing units. The central controller CC may also have a processing unit and may typically comprise means for continuously monitoring the condition of the wind turbines and collect statistics on its operation and may at the same time send control instructions to the wind turbines. The central controller CC may be connected to the wind power plant network DCN locally or remotely via a data communication network DCN or a public data communication network PDCN, e.g. the internet. Control related data may be transmitted to and from the wind turbines WT via a data communication network DCN. The wind turbines may via the data communication network be serial or parallel connected or any combination thereof. The control data may typically be data to control a wind turbine. This may e.g. be instructions to a given wind turbine to change the set-point of produced power. Simultaneously, the data communication network DCN is utilized for transmitting monitoring data from the wind turbines in the wind power plant WPP to the central controller CC. This may e.g. be a reading of a pressure meter of a valve of the wind turbine. The data communication network DCN may e.g. comprise a local area network LAN and/or a public data connection network, e.g. the internet.

Figure 3:
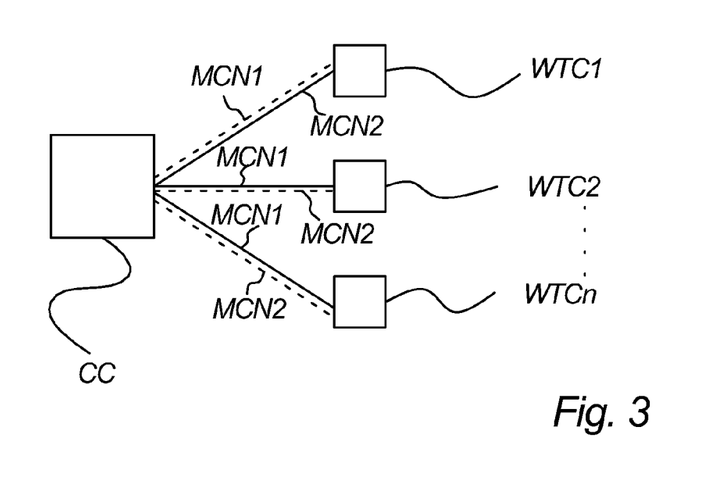
FIG. 3 illustrates an example of a data network of a wind power plant.

FIG. 3 illustrates an example of a data network of a wind power plant WPP according to an embodiment of the invention. The figure illustrates a simplified overview of the physical connection or network.

The figure illustrates a number of wind turbine controllers WTC1, WTC2, . . . , WTCn which are located in relation to a corresponding number of wind turbines (not shown), and a central controller CC. The central controller CC is connected to the wind turbine controllers WTC via a data communication network DCN, DCN1.

The wind turbine controllers WTC1, WTC2, . . . , WTCn may be located inside the corresponding wind turbines e.g. in the tower, the nacelle, etc. or it may be located outside the wind turbines.

It should furthermore be noted that the present figure is only one of several applicable data communication networks of a wind park in which the present invention may be implemented.

According to a typical conventional setup, data are transmitted to and from the wind turbine controllers WTC1, WTC2, ..., WTCn through one single network. In accordance with the present invention, data transmitted between the central controller CC and the wind turbine controllers WTC1, WTC2, ..., WTCn is transmitted via two different monitoring and control networks (monitoring and control networks) MCN1, MCN2. This means that monitoring and control data that are time critical may be transmitted via one dedicated data communication network, while other less critical data may be transmitted via another network. This results in much faster transmission of the important critical monitoring and control data.

Many communication bottlenecks exist in a wind turbine data network which may delay data significantly when transmitted both from the central controller CC to the wind turbine controllers WTC1, WTC2, ..., WTCn (typically control data) and from the wind turbine controllers WTC1, WTC2, WTCn to the central controller CC (typically monitoring data). These communication bottlenecks may be buffers, switches, routers, data-queues, etc It should be noted that both monitoring and control data are transmitted via both networks MCN1, MCN2.

It should furthermore be noted that the present figure is only one of several applicable data communication networks of a wind power plant WPP in which the present invention may be implemented.

Examples of data to be read in relation to a wind turbine, in relation to the wind turbine controller WTC.

"Active power measurement". Active power is the total power generated by the wind turbine to be directly used.

"Power Set Point" refers to the desired power to be produced by a given wind turbine WT.

"Available power" refers to the possible available energy in the present wind conditions.

"Turbine run state" comprises information of the current run state of a wind turbine e.g. if the wind turbine is shut off.

"Reactive power measurement". The flow of electrical energy from an inductive or capacitative load across a circuit towards a generator. Measured in volt-amperes-reactive (VAR), the conventional symbol for reactive power is "Q". Reactive power results when current is not in phase with voltage—and can be corrected using e.g. capacitors, statcom or other devices.

Examples of control data instructions to be transmitted from a central controller CC to the wind turbine controllers WTC1, WTC2, ..., WTCn are:

"Active power set point". An instruction of setting reactive power to a given value.

"Reactive power set point". An instruction of setting active power to a given value.

"Power Factor set point". An instruction of setting Power Factor (Cos(phi)) to a given value.

"Turbine run state". An instruction of setting turbine run state to a given state, e.g. "off".

Figure 4:
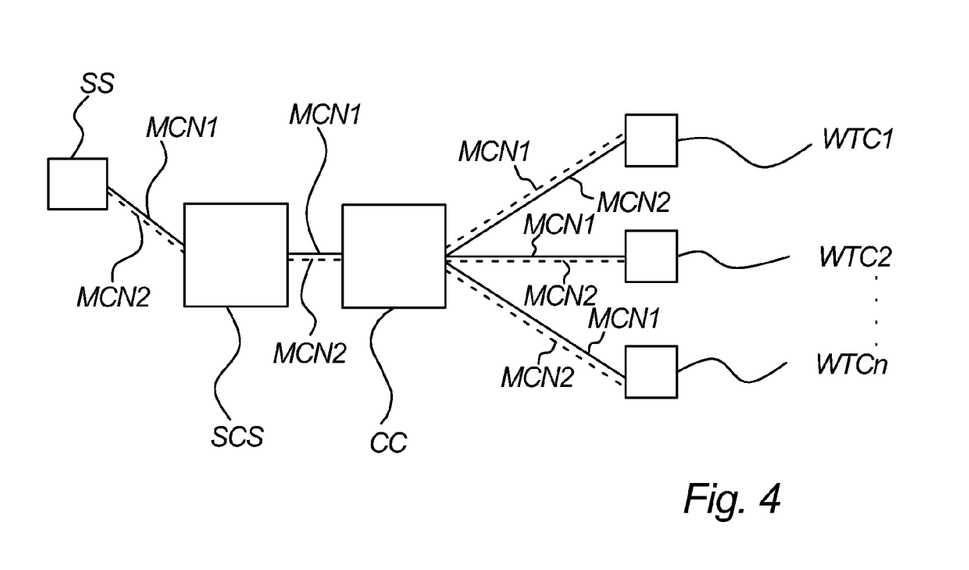
FIG. 4 illustrates another example of a data network of a wind power plant.

FIG. 4 illustrates another example of a data network of a wind power plant WPP according to an embodiment of the invention than the one illustrated with reference to FIG. 3. The figure illustrates a simplified overview of the physical connection or network.

The figure illustrates a number of wind turbine controllers WTC1, WTC2, ..., WTCn which are located in relation to a corresponding number of wind turbines (not shown), and a central controller CC. The central controller CC is connected to the wind turbine controllers WTC via monitoring and control data communication networks MCN1, MCN2, ..., MCNn. The central controller is in this particular embodiment of the invention related to a SCADA (Supervisory Control And Data Acquisition) server SCS which may communicate with other SCADA elements, e.g. other substations or a remote SCADA system SS.

In accordance with the present invention, data to transmitted between the central controller CC and the wind turbine controllers WTC1, WTC2, ..., WTCn is transmitted via two different monitoring and control networks MCN1, MCN2. This means that monitoring and control data that are time critical may be transmitted via one dedicated data communication network, while other less critical data may be transmitted via another network. This results in much faster transmission of the important critical monitoring and control data.

It should furthermore be noted that the networks illustrated in FIG. 3 and FIG. 4 is only two of several applicable data communication networks of a wind park in which the present invention may be implemented.

Figure 5:
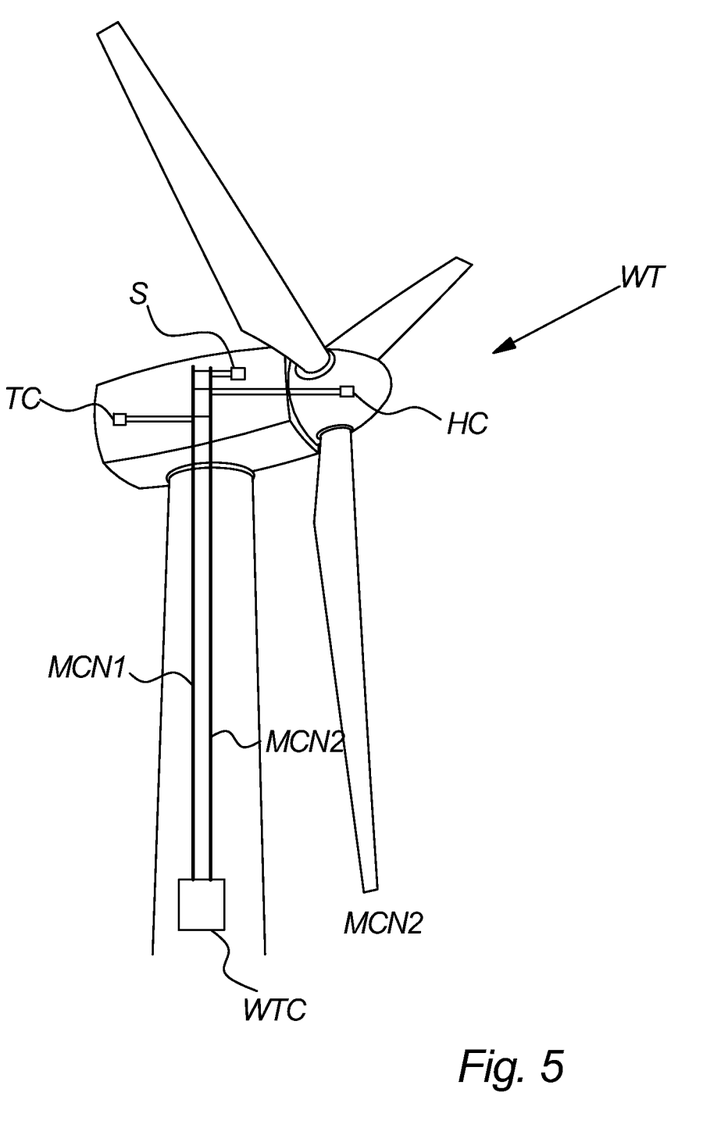
FIG. 5 illustrates a wind turbine WT according to an embodiment of the invention.

FIG. 5 illustrates a wind turbine WT according to an embodiment of the invention illustrating that several monitoring and control communication networks may be applied inside the wind turbine WT. The wind turbine WT comprises a wind turbine controller WTC which may be located inside or outside the wind turbine WT. The figure illustrates that the wind turbine controller WTC communicates with other elements in the wind turbine via different monitoring and control data networks MCN1, MCN2. The network is in this specific example arranged in such a manner that a first monitoring and control network (MCN1) and a second monitoring and control network (MCN2) are cabled as two buses to which the elements of the wind turbine may be connected. It should be noted that several other applicable network possibilities exist within the scope of the invention.

The illustrated wind turbine controller (WTC) may furthermore be connected to other wind turbines or a central controller (CC) via a first and second monitoring and control network (MCN1, MCN2).

It should be noted that any number of wind turbines more than one may be applied in accordance with other embodiments of the invention.

The wind turbine controller WTC communicates with a sensor S in the nacelle, a top controller TC and a hub controller HC via two different communication lines MCN1, MCN2.

The illustrated sensor S may be any sensor comprised in a wind turbine WT e.g. a temperature sensor. The top controller TC is a wind turbine element which comprises means for controlling the hub HC and the top controller TC is a unit which may control elements of the nacelle.

These elements to be connected with the wind turbine controller WTC inside the wind turbine WT is only examples of elements, whereas several other elements, e.g. additional controllers, may be connected via two or more different data communication networks within the scope of the invention.

Figure 6:
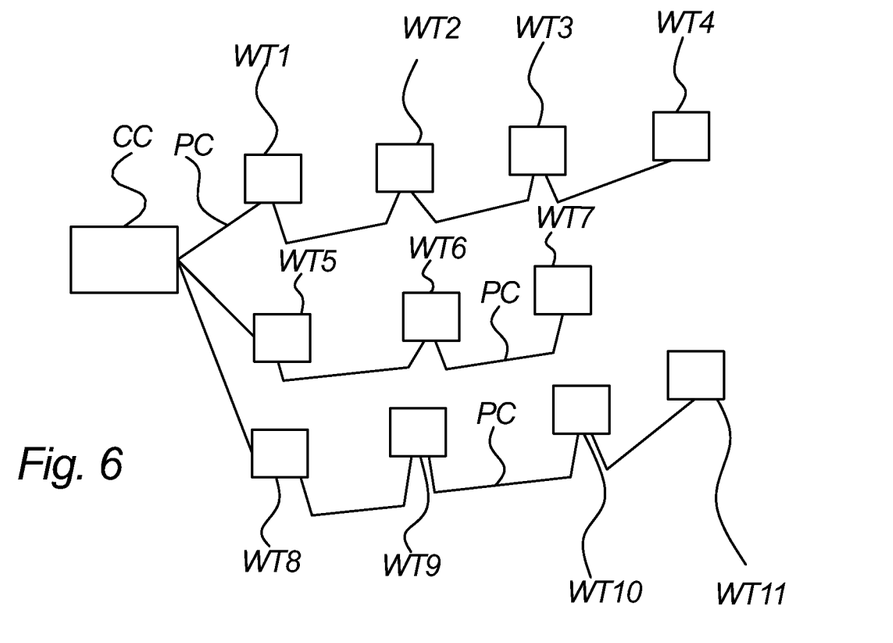
FIGS. 6 and 7 illustrate further details of an embodiment according to the invention.
Figure 7:
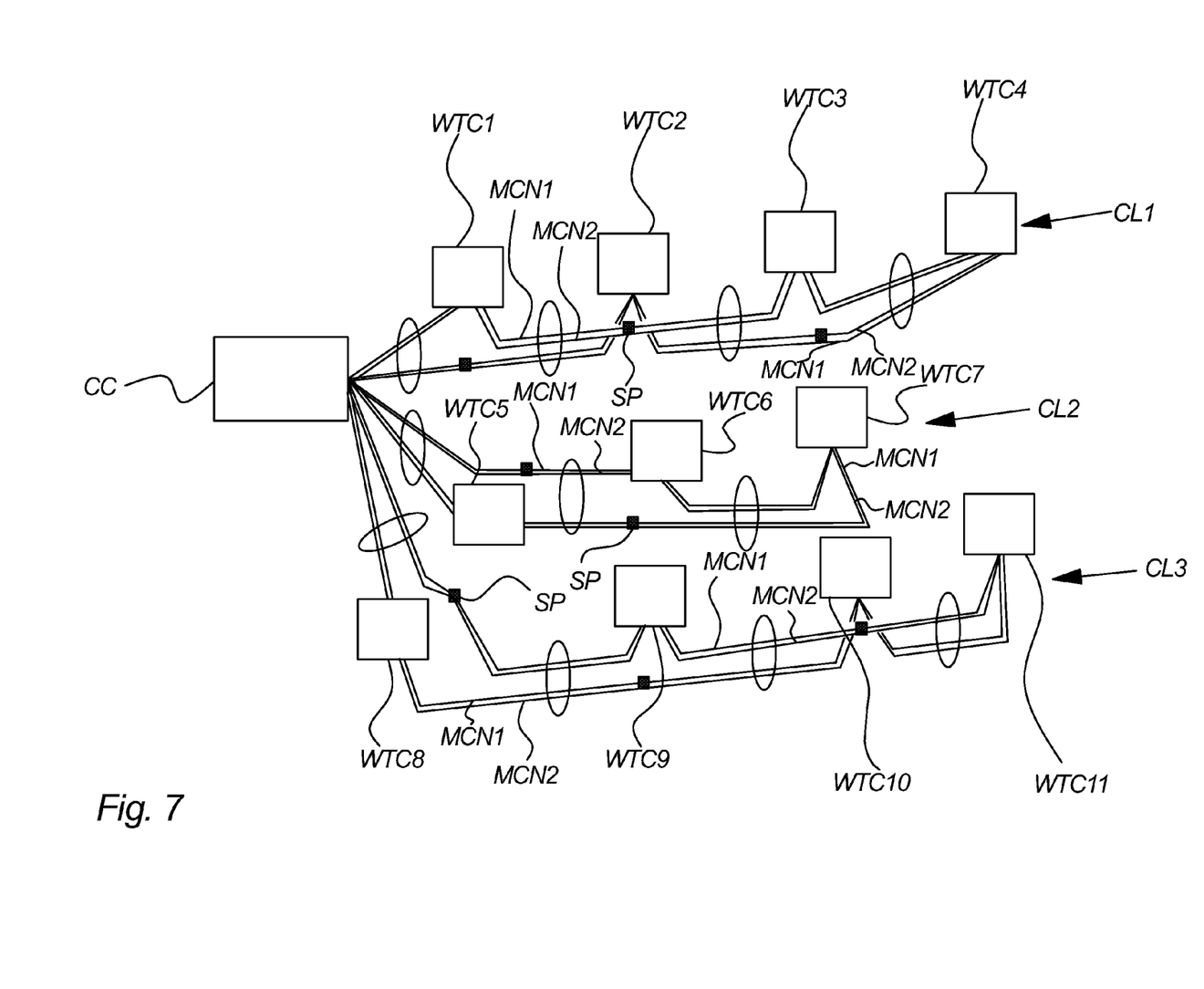

FIGS. 6 and 7 illustrate further details of an embodiment according to the invention.

The illustrated layout comprises a central controller CC connected by means of power cables PC to a number or wind turbines WT1 ... WT11. Evidently further wind turbines and associated controllers may be added.

Advantageously, the illustrated power cabling may also reflect the physical extent of the communication network, i.e. the monitoring and control network at least partially. This is in particular advantageous when the communication network is established by physical cables—compared to cordless networks—as the communication cables may be positioned together with the power cables thereby avoiding unnecessary excavation, mounting, suspension, etc. Accordingly, FIG. 7 illustrates the physical layout of a communication network established together with the power cable network of FIG. 6.

FIG. 7 illustrates the wind turbines controllers WTC1 to WTC 11 associated to the wind turbines illustrated in FIG. 6. The wind turbine controllers WTC1 ... WTC11 are connected by means of communication cables MCN establishing a monitoring and control networks MCN1 and MCN2.

Evidently, the topology of the network may vary within the scope of the invention.

The communication network may e.g. be established by means of fibers or galvanic conductors.

It is noted that the communication network is connected to establish communication loops CL1, CL2 and CL3.

It should be noted that the communication network may be established as a straightforward ring topology communication loop or as a star-shaped communication network or any combination of these or other types of communication layouts.

In the present context each communication loop may be established by means of a fiber pair which is properly spliced in splicing point SP to establish a communication ring through just one communication line between the wind turbine controllers.

It should be noted that one of the two separate monitoring and control networks MCN1, MCN2 both transmits monitoring and control related data, whereas the other may in accordance with an embodiment of the invention only transmit control related data.

In other embodiments of the invention, more than two control- or monitoring and control networks may be applied to extend the capability of the whole wind power plant network.

Figure 8:
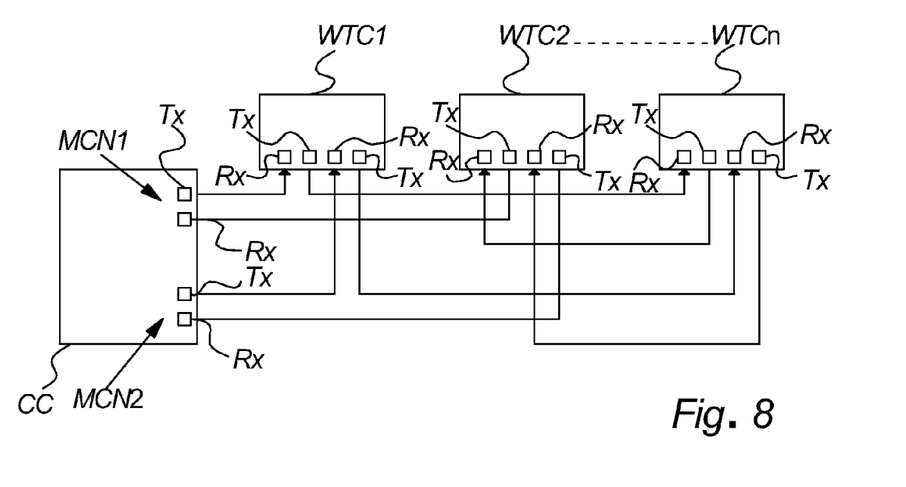
FIG. 8 illustrates an embodiment of the invention, where two communication networks MCN1 and MCN2 are established.

FIG. 8 illustrates the embodiment of FIG. 7 a little more detailed, where two communication networks MCN1 and MCN2 are established.

Both networks MCN1, MCN2 are as earlier described established by two cable pairs configured in two suitable—and in the case identical—ring topologies, establishing a ring communication for both networks MCN1 and MCN2.

The central controller CC and the wind turbine controllers WTC1, WTC2, WTCn have a transmitter Tx and a receiver Rx. The transmitters and receivers may be any data communication ports or controllers.

Figure 9:
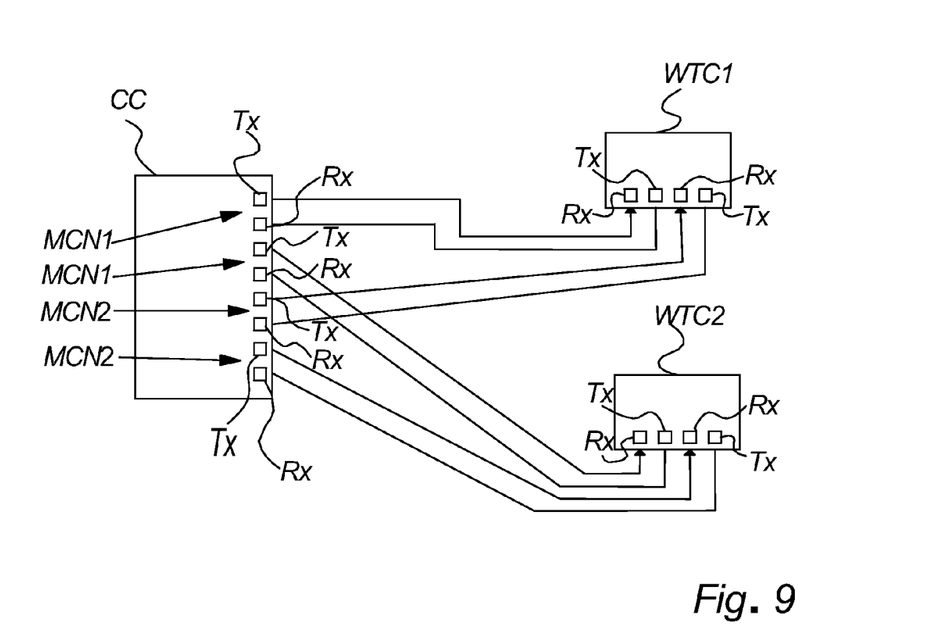
FIG. 9 illustrates another example of an applicable set-up the network according to an embodiment of the invention.

FIG. 9 illustrates another example of an applicable set-up of the network according to an embodiment of the invention.

The figure illustrates the same elements as FIG. 8 but here the monitoring and control networks MCN1, MCN2 are configured as a star-shaped topology.

With the star-shaped topology, the connection to each of the wind turbine controllers WTC1, WTC2 is secured if others go down.

In this set-up, a receiver Rx and a transmitter Tx are needed for every wind turbine controller WTC1, WTC2.

The invention claimed is:

1. A central controller adapted for controlling wind turbines, wherein said central controller is connected to and is configured to transmit data to and receive data from each of said wind turbines via a first network and a second network, and wherein control data for control of each of the wind turbines is distributed between at least the first network and the second network, the control data comprising critical power control data, wherein the critical power control data is communicated to and from said wind turbines exclusively via a selected one of the first and second networks.

2. The central controller according to claim 1, wherein said central controller controls and monitors said wind turbines via said first network and said second network by communication to and from respective wind turbine controllers of said wind turbines.

3. The central controller according to claim 1, wherein said first and second networks comprise at least one switch.

4. The central controller according to claim 1, wherein said wind turbines are comprised in a wind power plant.

5. The central controller according claim 1, wherein said central controller forms part of a control loop.

6. The central controller according to claim 1, wherein said central controller is part of a SCADA (Supervisory Control And Data Acquisition) server.

7. The central controller according to claim 1, wherein each of said wind turbines comprise at least two internal monitoring and control networks.

8. The central controller according to claim 1, wherein said first and second networks are configured in a ring topology, a star-shaped topology or any combination thereof.

9. The central controller according to claim 1, wherein said first and second networks transmit data simultaneously.

10. The central controller of claim 1, wherein the critical power control data comprises of one or more instructions that change an operating parameter of the wind turbines, the operating parameter affecting power produced by the wind turbines.

11. A wind power plant comprising:
at least two wind turbines; and
a central controller, wherein said at least two wind turbines transmit wind power plant monitoring data to, and receive control data from, said central controller via at least a first network, and wherein a second, independent network transmits only control data, the control data flows from said central controller to said at least two wind turbines.

12. The wind power plant according to claim 11, wherein a response time of a control loop of said second network is designed to be less than about one second.

13. The wind power plant according to claim 11, wherein said first and second networks comprises a copper, fiber or wireless network or a combination thereof.

14. The wind power plant according to claim 11, wherein said second network is configured for transmitting time sensitive data.

15. The wind power plant according to claim 11, wherein a power cable topology of power cables between said at least two wind turbines is substantially the same as a data communication network cable topology comprising the first and second networks between said at least two wind turbines.

16. A method of controlling a wind turbine in a wind power plant, whereby a central controller performs a monitoring and control procedure, the method comprising:
identifying high priority data by prioritizing at least one of: control related data and monitoring related data based on a time sensitivity attribute associated with the control and monitoring related data;
transmitting the high priority data between said central controller and the wind turbine using only a first network, the first network connecting said wind turbine and said central controller; and
transmitting at least a portion of the control and monitoring related data between said central controller and the wind turbine via a second network connecting said wind turbine and said central controller.

17. The method of claim 16, wherein transmitting monitoring related data is performed exclusively via the second network and wherein the second network does not transmit the high priority data.

18. The method of claim 16, wherein the high priority data transmitted by the first network does not include any monitoring related data, and wherein the first network transmits the high priority data from the central controller to the wind turbine.

19. The method of claim 16, wherein the control related data comprises instructions for setting operating parameters of the wind turbine and the monitoring related data comprises measured values associated with a component in the wind turbine.

20. A wind turbine comprising
- at least one wind turbine controller,
- a first network connecting said at least one wind turbine controller and wind turbine elements for transmitting monitoring data and control data between said wind turbine controller and said wind turbine elements, and
- a second, independent network connecting said at least one wind turbine controller and said wind turbine elements for transmitting only control data, the control data flows between said wind turbine controller and said wind turbine elements.

21. The wind turbine according to claim 20, wherein said second network is adapted for transmitting time sensitive control data.

22. The wind turbine according to claim 20, wherein at least one of said wind turbine elements is a hub controller.

23. The wind turbine according to claim 20, wherein at least one of said wind turbine elements is a top controller.

24. The wind turbine according to claim 20, wherein at least one of said wind turbine elements is a sensor.

25. The wind turbine according to claim 20, wherein less time sensitive power control data is communicated via said first network, and wherein more time sensitive power control data is communicated via said second network.

* * * * *